(12) United States Patent
Bookbinder et al.

(10) Patent No.: US 10,017,311 B2
(45) Date of Patent: Jul. 10, 2018

(54) HONEYCOMB ASSEMBLY AND PACKAGING SYSTEM

(71) Applicant: Corning Incorporated, Corning, NY (US)

(72) Inventors: Dana Craig Bookbinder, Corning, NY (US); Thomas Richard Chapman, Painted Post, NY (US); Pushkar Tandon, Painted Post, NY (US); Christopher John Warren, Waverly, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/700,687

(22) Filed: Sep. 11, 2017

(65) Prior Publication Data

US 2017/0369218 A1    Dec. 28, 2017

Related U.S. Application Data

(63) Continuation of application No. PCT/US2016/021295, filed on Mar. 8, 2016.

(60) Provisional application No. 62/132,569, filed on Mar. 13, 2015.

(51) Int. Cl.
| | |
|---|---|
| *B32B 7/00* | (2006.01) |
| *B65D 77/02* | (2006.01) |
| *B01D 46/24* | (2006.01) |
| *C04B 111/32* | (2006.01) |

(52) U.S. Cl.
CPC ......... *B65D 77/02* (2013.01); *B01D 46/2422* (2013.01); *B01D 46/2425* (2013.01); *B01D 2201/62* (2013.01); *C04B 2111/32* (2013.01); *C04B 2201/30* (2013.01)

(58) Field of Classification Search
None
See application file for complete search history.

(56) References Cited

U.S. PATENT DOCUMENTS

| | | |
|---|---|---|
| 8,518,857 B2 | 8/2013 | Bliss et al. |
| 2002/0153275 A1 | 10/2002 | Ryals |
| 2007/0292318 A1 | 12/2007 | Andoh et al. |

(Continued)

FOREIGN PATENT DOCUMENTS

| | | |
|---|---|---|
| DE | 102005010618 A1 | 9/2006 |
| WO | 2016153955 A1 | 9/2016 |
| WO | 2017091532 A1 | 6/2017 |

OTHER PUBLICATIONS

Matsui Kozai: http://www.matsuikozai.com/en/steelstock/index.html (Copyright 2015).*

(Continued)

*Primary Examiner* — David R Sample
*Assistant Examiner* — Nicole T Gugliotta
(74) *Attorney, Agent, or Firm* — Russell S. Magaziner

(57) ABSTRACT

A packaging system for honeycomb assemblies, each including a honeycomb body and reinforcing tube held together by an interference fit or axial compression achieved by thermal expansion coefficient differences between the honeycomb body and reinforcing tube. The reinforcing tube then protects the honeycomb body, facilitating a compact and structurally-strong package.

20 Claims, 8 Drawing Sheets

(56) References Cited

U.S. PATENT DOCUMENTS

2013/0248159 A1  9/2013  Yoshida et al.
2015/0071829 A1  3/2015  Oya et al.

OTHER PUBLICATIONS

International Search Report and Written Opinion of the International Searching Authority; PCT/US2016/021295; dated Aug. 5, 2016; 20 pages; European Patent Office.

* cited by examiner

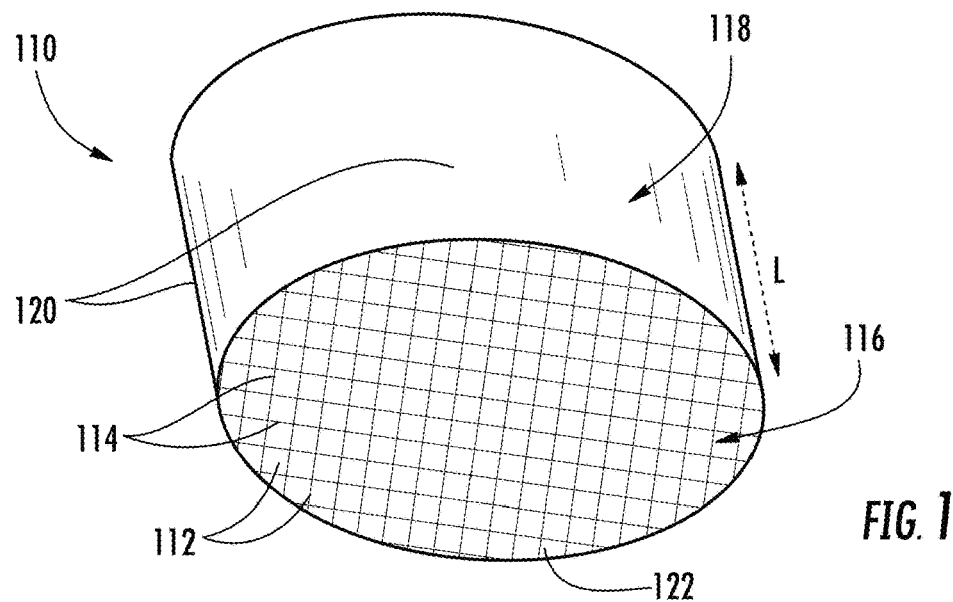
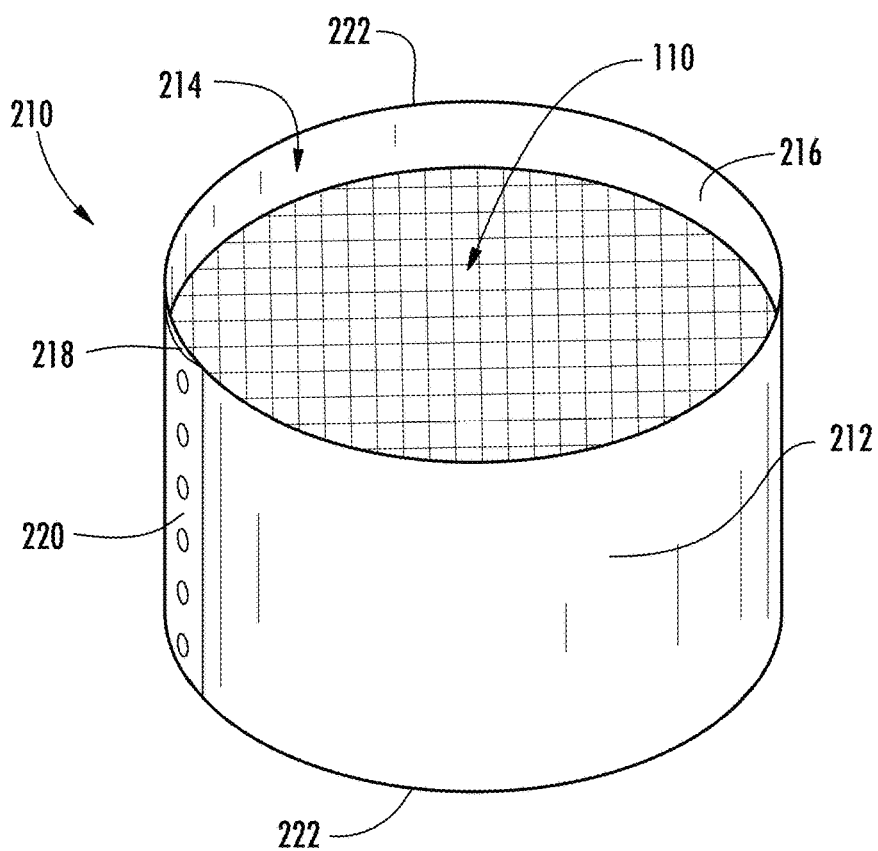

HONEYCOMB ASSEMBLY AND PACKAGING SYSTEM

This application is a continuation of International Patent Application Serial No. PCT/US16/21295, filed on Mar. 8, 2016, which claims the benefit of priority under 35 U.S.C. § 119 of U.S. Provisional application Ser. No. 62/132,569, filed on Mar. 13, 2015, the content of which is relied upon and incorporated herein by reference in their entirety.

BACKGROUND

Aspects of the present disclosure relate generally to honeycomb assemblies and packaging thereof, such as packaging of honeycomb bodies, such as hex- or rectilinear cellular ceramic bodies, or otherwise structured substrates, filters, partial filters, catalyzed substrates, and/or associated components that may be used in filters or emissions control devices, such as catalytic converters for diesel engines or other combustion engines.

Honeycomb bodies for emissions control devices may be designed with intricate internal structures, such as including many, very narrow and elongate flow paths for fluid, such as exhaust. The flow paths may be blocked with filters or may be open to through flow. The exterior shape of such honeycomb bodies typically conforms to the shape or design of the overall emissions control device, such as a cylindrical geometry with the flow paths extending at least partway between ends of the cylinder. Internal walls of the flow paths may be designed to be relatively narrow to increase the volume of fluid flow that can pass through a given substrate. However, as a result of the narrow structure, the substrates may be susceptible to damage if not handled or packaged properly. Because the substrates are often coated with precious metals, such as platinum, damaged substrates can be very costly if the precious metals are wasted.

To mitigate risks of damaging ceramic substrates during shipping of the substrates to coating facilities, manufacturers of substrates have developed elaborate packaging systems to protect the substrates and prevent inadvertent damage. Such systems may include individually wrapping the substrates in soft, cushioning materials such as foam, locating the cushioning material in rigid shells, and spacing the substrates far apart from one another in a package such that a package of ceramic substrates may overwhelming filled by packaging material (e.g., cardboard, foam, tape, paper, plastic, etc.) in terms of volume. Such packaging systems may serve to keep fragile substrates protected, but Applicants have found that relatively large volumes of packaging materials increases shipping costs and may be wasteful in terms of space in shipping and in terms of garbage.

A need exists for a packaging system for honeycomb assemblies, such as delicate ceramic substrates, that protects the substrates but does not waste space in shipping.

In addition to the above shortcomings of conventional packaging systems, perfect confidence in the structure of each individual ceramic substrate may not be achieved. For example, even with ideal performing manufacturers of substrates, some substrates may, from time to time, have defects or imperfections, such as due to mishandling, that could possibly lead them to crack or otherwise fail when fully assembled in the respective emissions control devices. As mentioned above, such failures tend to be very costly if precious metals are wasted.

A need exists to check honeycomb bodies, and to do so in close proximity to or as part of the packaging process, to reduce chances of shipping defective substrates.

SUMMARY

One embodiment relates to a package of honeycomb assemblies, which includes a package housing containing a plurality of honeycomb assemblies and defining an exterior of the package. Each honeycomb assembly includes a honeycomb body that includes flow paths extending lengthwise at least partway therethrough and a reinforcing tube having at least a portion thereof surrounding the honeycomb body. The reinforcing tube has an interior volume defined as all space interior to interior surfaces of the portion of the reinforcing tube surrounding the honeycomb body, where, at shipping temperatures of between $-50°$ Celsius (C.) and $100°$ C., the reinforcing tube is in tension around the honeycomb body such that the reinforcing tube provides a radial inward force upon the honeycomb body that results in an interference fit to hold the honeycomb body within the interior volume of the reinforcing tube. Accordingly, the reinforcing tube holds tight and physically protects the honeycomb body within the package housing. Further, the package housing has a package volume defined as all space interior to exterior surfaces of the package housing, where the plurality of honeycomb assemblies fill at least 50% of the package volume, thus efficiently packaging the honeycomb assemblies.

Another embodiment relates to a honeycomb assembly, such as one that may be contained in the above package or otherwise. The honeycomb assembly includes a honeycomb body with flow paths extending lengthwise at least partway therethrough and a reinforcing tube having at least a portion thereof surrounding the honeycomb body and an interior volume defined as all space interior to interior surfaces of the portion of the reinforcing tube surrounding the honeycomb body. The reinforcing tube includes a metal material and the honeycomb body includes a ceramic material. At a room temperature of $25°$ C., the reinforcing tube is in tension and provides a first radial inward force upon the honeycomb body that results in an interference fit holding the honeycomb body within the interior volume of the reinforcing tube. The metal material of the reinforcing tube has a greater coefficient of thermal expansion than the ceramic material of the honeycomb body such that, when heated to a high temperature, the reinforcing tube provides a second radial inward force upon the honeycomb body that is less than 10% of the first radial inward force. The high temperature is at least $300°$ C. and less than a melting temperature of the metal material. Accordingly, heating the honeycomb assembly to the high temperature aids positioning of the honeycomb body with respect to the reinforcing tube and/or facilitates formation of the interference fit upon cooling of the honeycomb assembly.

Yet another embodiment relates to a honeycomb assembly, which includes a honeycomb body with flow paths extending lengthwise therethrough and a reinforcing tube having at least a portion thereof surrounding the honeycomb body and an interior volume defined as all space interior to interior surfaces of the portion of the reinforcing tube surrounding the honeycomb body. At temperatures of between $-50°$ Celsius (C) and $100°$ C., such as typical package shipping temperatures, the reinforcing tube is in tension around the honeycomb body such that the reinforcing tube provides a radial inward force upon the honeycomb body that results in an interference fit to hold the honeycomb body within the interior volume of the metal skin. The length of the metal skin is greater than the length of the honeycomb body such that at least one of the ends of the reinforcing tube extends lengthwise beyond one of the ends of the honeycomb body as the honeycomb body is held within the interior volume of the reinforcing tube. Accordingly, the extending end or ends of the reinforcing tube helps to physically protect the corresponding end of the honeycomb body by serving as a raised curb to limit inadvertent end-face contact.

Still another embodiment includes a method of structurally testing a honeycomb body. The method includes a step of positioning a honeycomb body within a metal tube, where, at the time of the positioning, the metal tube is at a temperature above 200° C. The method includes a subsequent step of cooling the metal tube to a temperature of between −50° C. and 100° C., where, during the cooling, the tube contracts and applies a radial inward force to the honeycomb body. Following the cooling, the honeycomb body either demonstrates structural integrity by remaining intact, or cracks or otherwise fails under the radial load of the tube.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which:

FIG. 1 is a perspective view of a honeycomb body.

FIG. 2 is a perspective view of a honeycomb assembly according to an exemplary embodiment.

DETAILED DESCRIPTION

Figure 3:
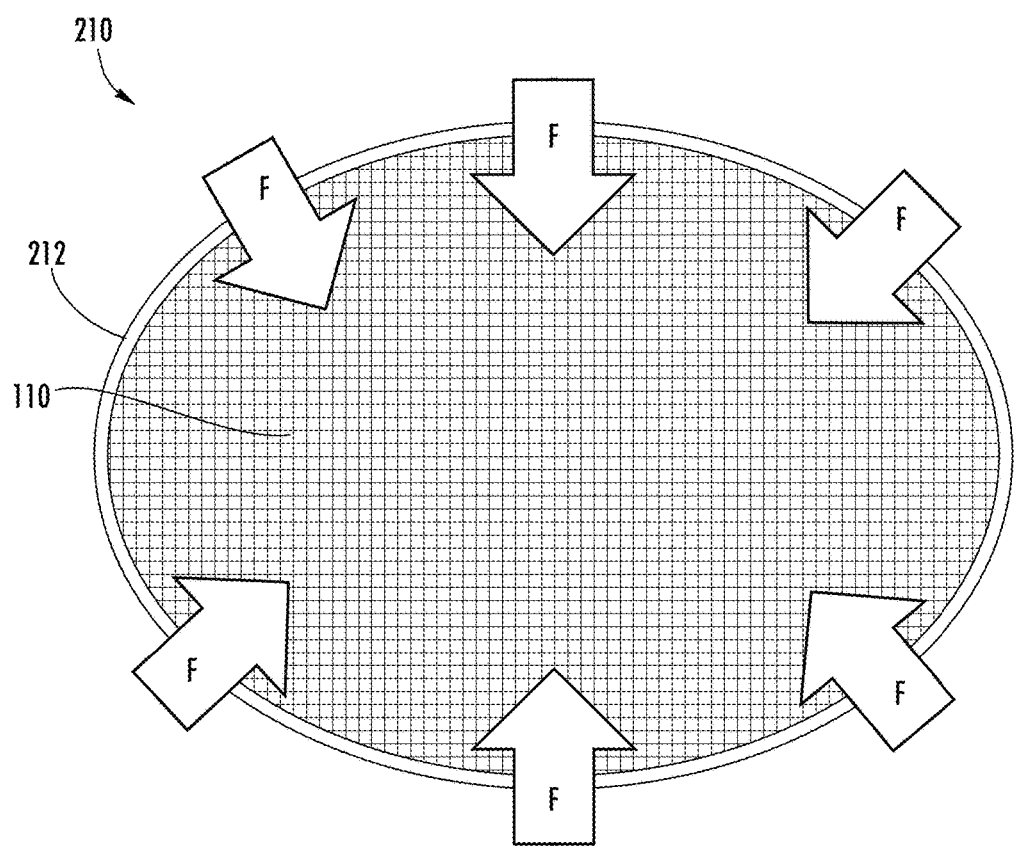
FIG. 3 is an end view of the honeycomb assembly of FIG. 2.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Referring to FIG. 1, a body, such as a honeycomb body 110, cellular body, filter substrate, filter, as hex- or rectilinear cellular ceramic bodies, partial filter, catalyzed substrate, etc., may be configured for use in filters or emissions control devices, such as catalytic converters for diesel engines or other combustion engines. For example, the honeycomb body 110 may be coated or layered with a chemical or material that helps to change the composition of a fluid, such as by chemical conversion, attraction, or another mechanism. Depending upon the particular type of filter or device, the fluid may be exhaust from a combustion engine, or other fluids (e.g., air, water, gasoline). In some applications, the coated chemical may be a precious metal, such as platinum.

In some embodiments, the honeycomb body 110 includes a ceramic material. In some such embodiments, excluding porosity (e.g., gas, air, open areas) such as between the walls and the flow channels, the material of the honeycomb body 110 consists at least 80% by volume of a ceramic material, such as consists at least 95% by volume of a ceramic material, such as consists essentially of a ceramic material. In some such embodiments, the honeycomb body 110 is at least 50% porous by volume, such as at least 70% porous by volume, including porosity in the material (e.g., within the walls) and including the flow paths 112 or channels. In some embodiments, the ceramic material is cordierite, aluminum titanate, and/or silicon carbide. In other embodiments, the substrate may not include a ceramic, or may include a ceramic as part of a composite, such as in combination with non-ceramic layers or internal fibers. Ceramic may be useful for ease of manufacturing of the honeycomb body 110 and/or for material properties of the ceramic material, such as in terms of low coefficient of thermal expansion, relatively high melting or softening temperatures, etc. For example, in some embodiments, the ceramic material has a thermal expansion coefficient of no more than $60 \times 10^{-7}$ cm/cm/° C., such as no more than $45 \times 10^{-7}$ cm/cm/° C., such as no more than $35 \times 10^{-7}$ cm/cm/° C., and/or at least $15 \times 10^{-9}$ cm/cm/° C. According to an exemplary embodiment, the ceramic material has a modulus of rupture of at least 0.9 MPa, such as at least 2 MPa, such as at least 3 MPa, such as at least 5 MPa, and/or in some embodiments no more than 1.5 GPa, and is thereby able to sustain compressive stresses.

The honeycomb body 110 may be designed to have low-resistance to passing fluid while still effectively changing the composition of the fluid, such as by having many small elongate flow paths 112 (e.g., pathways, channels, cells), with thin walls 114 therebetween. According to an exemplary embodiment, the honeycomb body 110 includes a plurality of the flow paths 112 extending lengthwise at least party (e.g., at least 50%, at least 90%) therethrough, such as at least 10 flow paths 112, at least 50 flow paths 112, at least 200 flow paths 112, and/or in some embodiments no more than 50,000 flow paths. The flow paths 112 may be of a uniform or consistent geometry, giving the transverse cross-section of the honeycomb body 110 the general appearance of a honeycomb (see FIG. 1). In some embodiments, the flow paths 112 are square in the cross-section. In other embodiments, flow paths are hexagonal. In still other embodiments, flow paths may be otherwise shaped in cross-section, such as round, rectangular, and/or non-uniform.

In some embodiments, the honeycomb body 110 has between about 100 to 1000 flow paths 112 per square inch in transverse cross-section, such as about 300 or about 900. In some embodiments, at least some of the flow paths 112 are plugged, such as alternatingly plugged and unplugged on an end face 116 thereof, to help guide fluid flow and/or facilitate filtration. According to an exemplary embodiment, the walls 114 (e.g., webs) between adjoining flow paths 112 of the honeycomb body 110 are particularly thin, such as less than 50 mils, such as less than 20 mils, and/or at least 1 mil, such as at least about 1.5 mils; for example about 2 mils or about 12 mils, plus or minus a half mil.

In terms of geometry, according to an exemplary embodiment, the honeycomb body 110 includes the end faces 116 and a body 118 extending lengthwise therebetween. The length L of the honeycomb body 110 may be at least 2 cm and/or no longer than 1 m, such as at least 5 cm and/or no longer than 80 cm, such as at least 10 cm and/or no longer than 50 cm, where the length L may depend upon the particular use or application of the honeycomb body 110. Openings for the flow paths 112 may be located on the end faces 116, such as only on the end faces 116.

In some embodiments, the overall geometry of the honeycomb body 110 may be curvilinear, such as cylindrical, such as being a right circular cylinder, elliptic cylinder, parabolic cylinder, or hyperbolic cylinder. In other embodiments, a substrate may be cuboid, such as rectangular cuboid, right cuboid, rectangular hexahedron, right rectangular prism, or rectangular parallelepiped. In still other embodiments, a substrate may be a combination of curvilinear and cuboid, such as being a right rectangular cuboid with rounded edges, or the substrate may be otherwise shaped. In some such embodiments, the honeycomb body 110, in cross-section transverse to the lengthwise direction, has a periphery 122 that includes at least a portion thereof that is rounded, which may improve the ability of the honeycomb body 110 to support compressive loading, as discussed below. In some embodiments, the honeycomb body 110 is a wall-flow particulate filter or an open channel flow-through substrate.

The end faces 116 may be generally planar and the geometry of the end faces 116 may match one another. The end faces 116 may be generally parallel to one another, such as planes oriented within 15-degrees of one another. According to an exemplary embodiment, exterior-most sides 120 of the honeycomb body 110 may extend between the end faces 116 generally at a right angle to the periphery 122 of the end faces 116. In other embodiments, end faces may be otherwise shaped and oriented differently with respect to one another and/or with respect to sides of a substrate.

According to an exemplary embodiment, the honeycomb body 110 may be somewhat fragile, such as due to the thin walls and/or the material selection, and may be susceptible to damage if mishandled, such as inadvertent crushing of the end faces 116 or sides 120.

Figure 6:
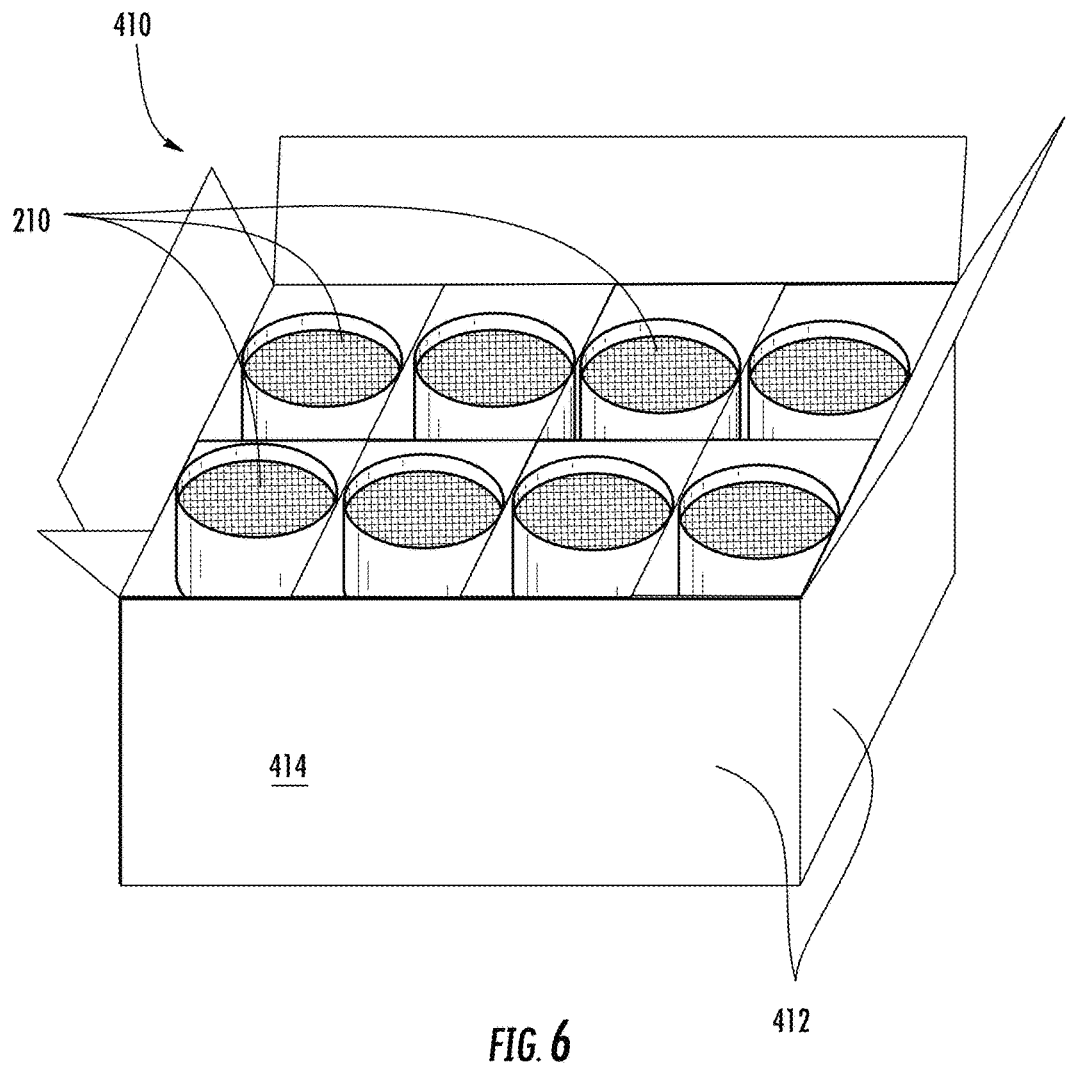
FIG. 6 is a perspective view of a package of honeycomb assemblies according to an exemplary embodiment.

Referring now to FIGS. 2-3, a honeycomb assembly 210 (e.g., filter assembly, substrate assembly, canned filter) includes the honeycomb body 110 of FIG. 1 and a reinforcing tube 212 (e.g., reinforcing skin, metal skin, pipe, can, shell, buttress) having at least a portion thereof surrounding the honeycomb body 110, which may increase physical protection of the honeycomb body 110, such as during shipping in a package. As shown in FIG. 2, the reinforcing tube 212 has an interior volume 214, which may be defined as all space interior to interior surfaces 216 of the portion of the reinforcing tube 212 surrounding the honeycomb body 110. The term "surfaces 216" includes a single continuous curved surface as shown in FIG. 6, or more complex geometries, and is not meant to infer that the reinforcing tube 212 necessarily includes multiple discrete surfaces. At a room temperature of 25° C., the reinforcing tube 212 is in tension and provides a radial inward force F (see FIG. 3) upon the honeycomb body 110 that results in an interference fit holding the honeycomb body 110 within the interior volume of the reinforcing tube 212.

According to an exemplary embodiment, the reinforcing tube 212 includes a metal material, such as consists at least 50% by volume of the metal material (excluding open area of the tube), such as consists at least 99% by volume of the metal material, such as consists essentially of the metal material. In some embodiments, the material of the tube is or includes a ferrous metal. In some embodiments, the material of the tube is or includes steel, such as stainless steel, such as "409 or 410 stainless steel" or "304, 310 or 316 stainless steel," the steel having a coefficient of expansion between 25° C. to 300° C. of about $80 \times 10^{-7}$ cm/cm/° C. to about $200 \times 10^{-7}$ cm/cm/° C. In some embodiments, the material of the reinforcing tube 212 is or includes low expansion metal alloys such as stainless steel, such as Alloy 42 and Alloy 52 alloys or other such alloys or steels, the steel having a coefficient of expansion between 25° C. to 300° C. of about 40 to about $100 \times 10^{-7}$ cm/cm/° C. In some embodiments, the material of the reinforcing tube 212 is or includes very low expansion metal alloys such as stainless steel, such as Invar® or Kovar® alloys, or other such alloys or steels having a coefficient of expansion between 25° C. to 300° C. of about 40 to about $55 \times 10^{-7}$ cm/cm/° C. In some embodiments, the metal material is from a metal sheet, rolled to form the reinforcing tube 212, that has a thickness of at least 0.01 mm, such as at least 0.5 mm, such as at least 1 mm, such as at least 1.2 mm, and/or no more than 1 cm, such as no more than 5 mm, such as no more than 2 mm, such as no more than 1 mm. In some embodiments, the sheet is 14-gauge or a higher gauge (e.g., 24-, 20-, 16-gauge) stainless steel. In other embodiments the reinforcing tube is or includes aluminum. In still other embodiments, material of the reinforcing tube 212 is non-metal.

In some embodiments, the material of the reinforcing tube 212 has a thermal expansion coefficient of at least $70 \times 10^{-7}$ cm/cm/° C., such as at least $80 \times 10^{-7}$ cm/cm/° C., such as at least $100 \times 10^{-7}$ cm/cm/° C., and/or no more than $50 \times 10^{-5}$ cm/cm/° C. In some embodiments, the material of the reinforcing tube 212 has a thermal expansion coefficient between 25° C. to 300° C. of at least $80 \times 10^{-7}$ cm/cm/° C., and the material of the honeycomb body 110 has a thermal expansion coefficient of no more than $50 \times 10^{-7}$ cm/cm/° C. In some embodiments, the material of the reinforcing tube 212 has a thermal expansion coefficient between 25° C. to 300° C. of at least $40 \times 10^{-7}$ cm/cm/° C., and the material of the honeycomb body 110 has a thermal expansion coefficient of no more than $30 \times 10^{-7}$ cm/cm/° C. In some embodiments, the material of the reinforcing tube 212 has a thermal expansion coefficient between 25° C. to 300° C. of at least $40 \times 10^{-7}$ cm/cm/° C., and the material of the honeycomb body 110 has a thermal expansion coefficient of no more than $2 \times 10^{-7}$ cm/cm/° C.

Applicants have discovered a unique approach to inserting and locking the honeycomb body 110 within the reinforcing tube 212 that takes advantage of differences in coefficient of expansion between the honeycomb body 110 and the reinforcing tube 212. In some embodiments, the material of the reinforcing tube 212 has a greater coefficient of thermal expansion than the material of the honeycomb body 110 such that, when heated to a high temperature (e.g., at least 200° C., at least 400° C., at least 500° C., between 500° C. and the melting temperature of the tube material, no more than 1500° C.), the reinforcing tube 212 expands to a greater degree than the honeycomb body 110, allowing the honeycomb body 110 to be positioned therein. Next, upon cooling, the tube material contracts faster than the honeycomb material, which causes the reinforcing tube 212 to grip the honeycomb body 110 due the relative size of the honeycomb body 110 and the reinforcing tube 212. At normal operating or shipping temperatures (e.g., −50° C. to 100° C.) and room temperature (e.g., 25° C.), the reinforcing tube 212 tightly grips the honeycomb body 110 and accordingly provides a strong outer shell to the honeycomb body 110 to limit physical damage to the honeycomb body 110, such as during shipping. Accordingly, the honeycomb body 110 may be secured in the reinforcing tube 212 without adhesives, fasteners, spacing/filling materials, etc., which may be wasteful, unsightly, and cumbersome to apply.

Referring to FIG. 2, the reinforcing tube 212 includes an overlap 218 and a fastening line 220 where the reinforcing tube 212 has been fastened to form a closed loop around the honeycomb body 110 at a high temperature. In other contemplated embodiments, the reinforcing tube 212 may be crimped, riveted, belted, or otherwise fastened about the honeycomb body 110 at the high temperature. A combination of such techniques may be used to fasten the reinforcing tube 212 about the honeycomb body 110 at the high temperature, such as tightening the reinforcing tube 212 around the honeycomb body 110 with a metal screw band, and then fastening the reinforcing tube 212 in the tightened position, such as by spot welding along the overlap 218 of edges of a sheet forming the reinforcing tube 212. In other embodiments, the reinforcing tube 212 is a pipe, such as a cast metal or molded pipe, without an overlap 218 and/or fastening line 220.

Contraction of the reinforcing tube 212 due to cooling from the high temperature results in the radial inward force F that provides the interference fit to hold the honeycomb body 110. According to some exemplary embodiments, the radial inward force F results in at least 1.0 MPa of radial compression on the honeycomb body 110 at the room temperature, such as at least 1.3 MPa of radial compression on the honeycomb body 110 at the room temperature, such as at least 1.5 MPa of radial compression on the honeycomb body 110 at the room temperature, and/or less than 150 MPa. In some such embodiments, the radial inward force F results in no more than 800 kPa of radial compression on the honeycomb body 110 at the high temperature (e.g., 500° C.), such as no more than 650 kPa of radial compression on the honeycomb body 110 at the high temperature, such as no more than 400 kPa of radial compression on the honeycomb body 110 at the high temperature, and/or zero compression or a small amount of radial compression greater than zero (e.g., at least 1 Pa). As such, heating the honeycomb assembly 210 to the high temperature aids positioning of the honeycomb body 110 with respect to the reinforcing tube 212 and/or facilitates formation of the interference fit upon cooling of the honeycomb assembly 210.

In some embodiments, the reinforcing tube 212 provides a radial inward force F when the reinforcing tube 212 is at room temperature of 25° C. (e.g., first radial inward force) and a different magnitude of the radial inward force F when the reinforcing tube 212 is at a high temperature (e.g., second radial inward force), such as at least 500° C. and less than a melting temperature of the material of the reinforcing tube 212, which is due to greater expansion of the reinforcing tube 212 than the honeycomb body 110. In some such embodiments, the radial inward force F at the high temperature is less than 50% than the radial inward force F at the room temperature, such as less than 20% than the radial inward force F at the room temperature, such as less than 10% than the radial inward force F at the room temperature, and/or zero radial inward force F or a small amount of radial inward force F greater than zero (e.g., at least 0.001% of the first radial inward force F).

Figure 4:
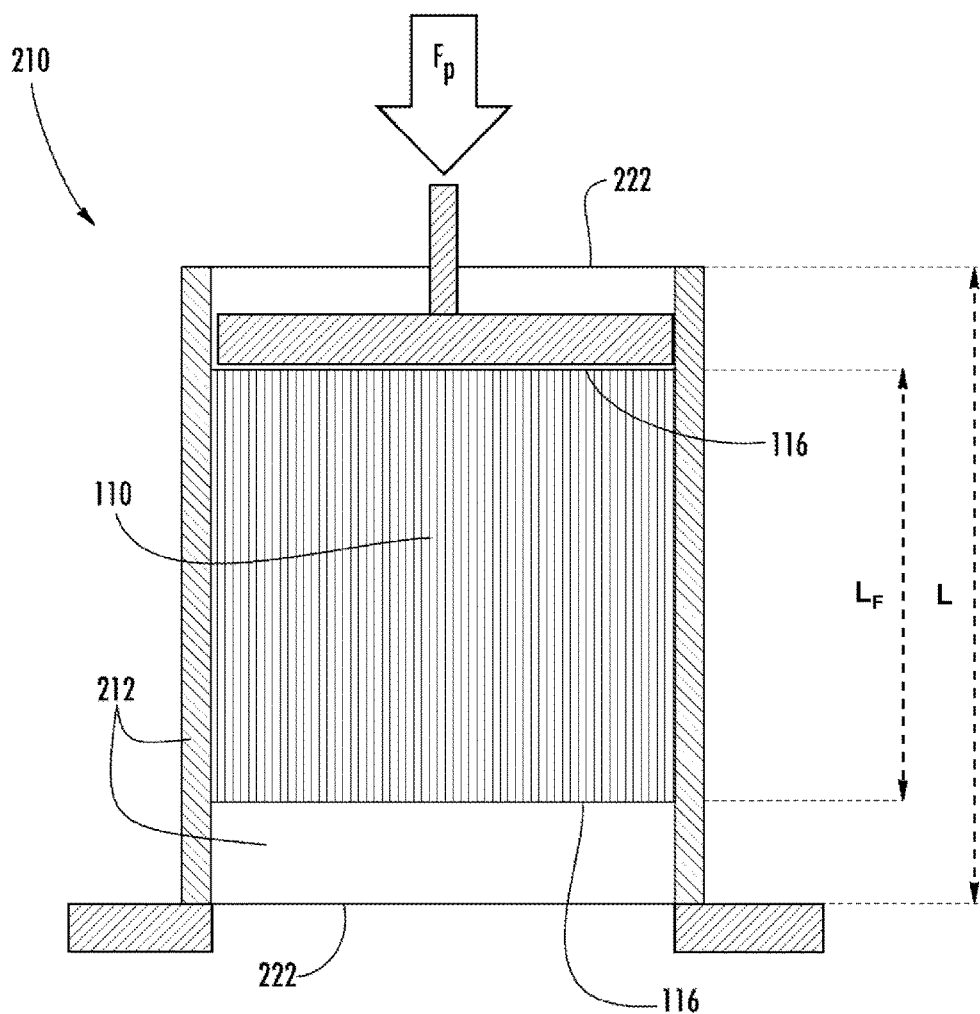
FIG. 4 is a schematic diagram of a honeycomb assembly with a substrate receiving a push-out force.

Referring to FIG. 4, at the room temperature, the honeycomb body 110 remains held (e.g., fixed, stationary, positioned within the reinforcing tube 212) when the honeycomb body 110 is loaded by a push-out force $F_p$ of up to 200 newtons distributed over one end of the honeycomb body 110, and where the reinforcing tube 212 is held in place, such as a push-out force $F_p$ of up to 500 newtons, such as a push-out force $F_p$ of up to 800 newtons. In some embodiments, resistance to the push-out force $F_p$ is entirely provided by the interference fit. In other contemplated embodiments, extensions 612 (see FIG. 9), such as ledges, tabs, dimples, etc. extending inward from the reinforcing tube 212 may further lock the honeycomb body 110 into place, such as in addition to the interference fit. Secure, tight locking of the honeycomb body 110 within the reinforcing tube 212 helps to limit sliding and wear of the sides 120 of the honeycomb body 110 upon the interior surfaces 216 of the reinforcing tube 212, such as when undergoing vibration during transportation, and other accelerations such as dropping of an associated package containing the honeycomb assembly 210.

Referring to FIGS. 1-2 and 4, honeycomb body 110 has end faces 116 and a length L of body 118 therebetween, and the reinforcing tube 212 has ends 222 and a length of the reinforcement tube 212 therebetween. As shown in FIG. 4, the length L of the reinforcing tube 212 is greater than the length $L_F$ of the honeycomb body 110 such that at least one of the ends 222 of the reinforcing tube 212 extends lengthwise beyond one of the end faces 116 of the honeycomb body 110 as the honeycomb body 110 is held within the interior volume of the reinforcing tube 212. Accordingly, the at least one extending end 222 of the reinforcing tube 212 helps physically protect the respective end face 116 of the honeycomb body 110 by serving as a raised curb or shoulder to limit inadvertent end face 116 contact.

In some embodiments, the honeycomb body 110 is held within the interior volume of the reinforcing tube 212 such that both ends 222 of the reinforcing tube 212 extend lengthwise beyond the respective end faces 116 of the honeycomb body 110, as shown in FIG. 4. For example, the ends 222 of the reinforcing tube 212 extend lengthwise beyond the respective end faces 116 of the honeycomb body 110 by at least 5 millimeters at each of the end faces 116, such as by at least a centimeter, such as by at least 3 centimeters, and/or by no more than 1.5 meters at each of the end faces 116.

Figure 5:
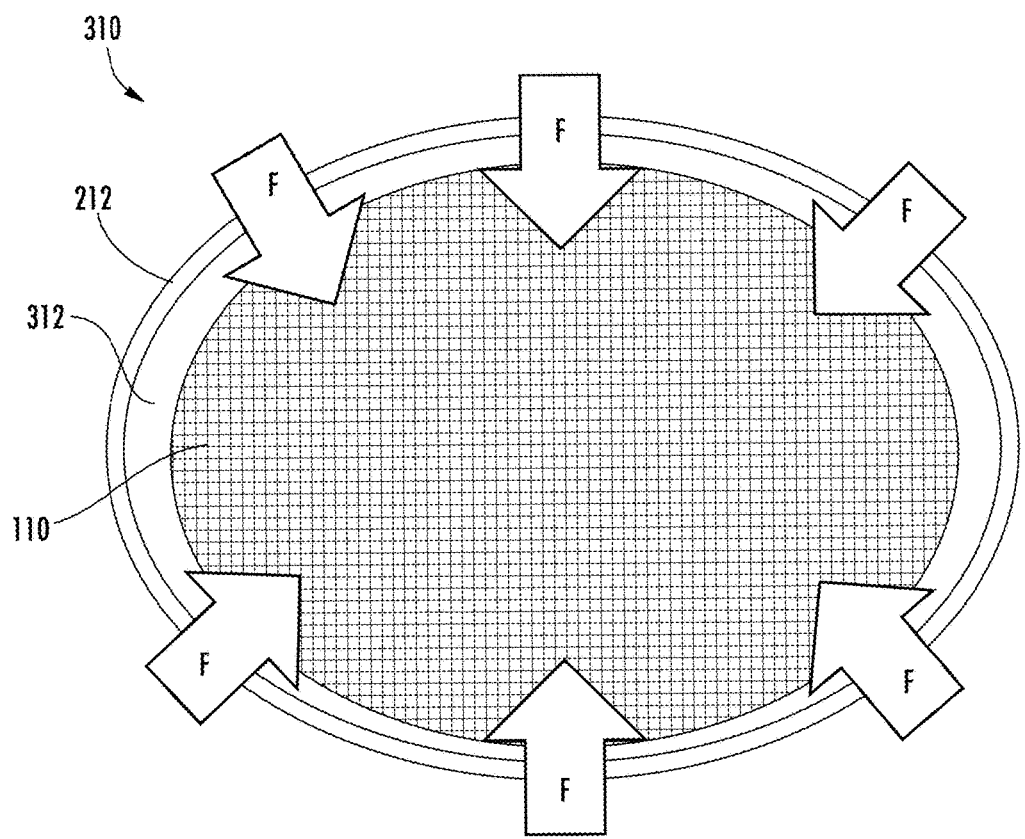
FIG. 5 is an end view of a honeycomb assembly according to another exemplary embodiment.

As shown in FIGS. 1-4, in some embodiments, the reinforcing tube 212 directly contacts at least some exteriormost sides 120 or surfaces of the honeycomb body 110. In other embodiments, as shown in FIG. 5, a honeycomb assembly 310 may include an intermediate layer 312 or element between the reinforcing tube 212 and the honeycomb body 110, such as a filler, an insulator, a mat, a foam, a spacer, etc. According to an exemplary embodiment, the intermediate layer 312 is thin or rigid/incompressible enough that contraction of the reinforcement tube 212 still provides an interference fit to hold the honeycomb body 110, as described herein.

Referring to FIG. 6, a package 410 of honeycomb assemblies 210 includes a package housing 412 (e.g., box, container) containing a plurality of honeycomb assemblies 210 (or 310) and defining an exterior of the package. Each honeycomb assembly 210 includes a honeycomb body 110, as described herein, and a reinforcing tube 212 having at least a portion thereof surrounding the honeycomb body 110, as described herein. At shipping temperatures of between −50° Celsius (C.) and 100° C., the reinforcing tube 212 is in tension around the honeycomb body 110 such that an interference fit holds the honeycomb body 110 within the interior volume of the reinforcing tube 212, as described herein. Accordingly, the reinforcing tube 212 holds tight and physically protects the honeycomb body 110 within the package housing 412.

Further, the package housing 412 has a package volume defined as all space interior to exterior surfaces 414 of the package housing 412. At least in part due to the efficient design of the honeycomb assemblies 210 (or 310), the plurality of honeycomb assemblies 210 fill at least 30% of the package volume, such as at least 50%, such as at least 60%, and/or no more than 97%, thus efficiently packaging the honeycomb assemblies 210, such as when compared to many conventional packages. In some such embodiments, the honeycomb bodies 110 have a honeycomb volume defined as all space interior to exterior-most sides 120 or surfaces of the respective honeycomb body 110, and at least 20% of the package volume is filled by the honeycomb volume, such as at least 50% of the package volume is filled by the honeycomb volume, such as at least 60% of the package volume is filled by the honeycomb volume, and/or no more than 95% of the package volume is filled by the honeycomb volume. In contemplated embodiments, a package housing 414, as described herein, may only include a single honeycomb assembly 210 (or 310), and may be efficiently packaged according to the filling percentages of this paragraph.

Figure 7:
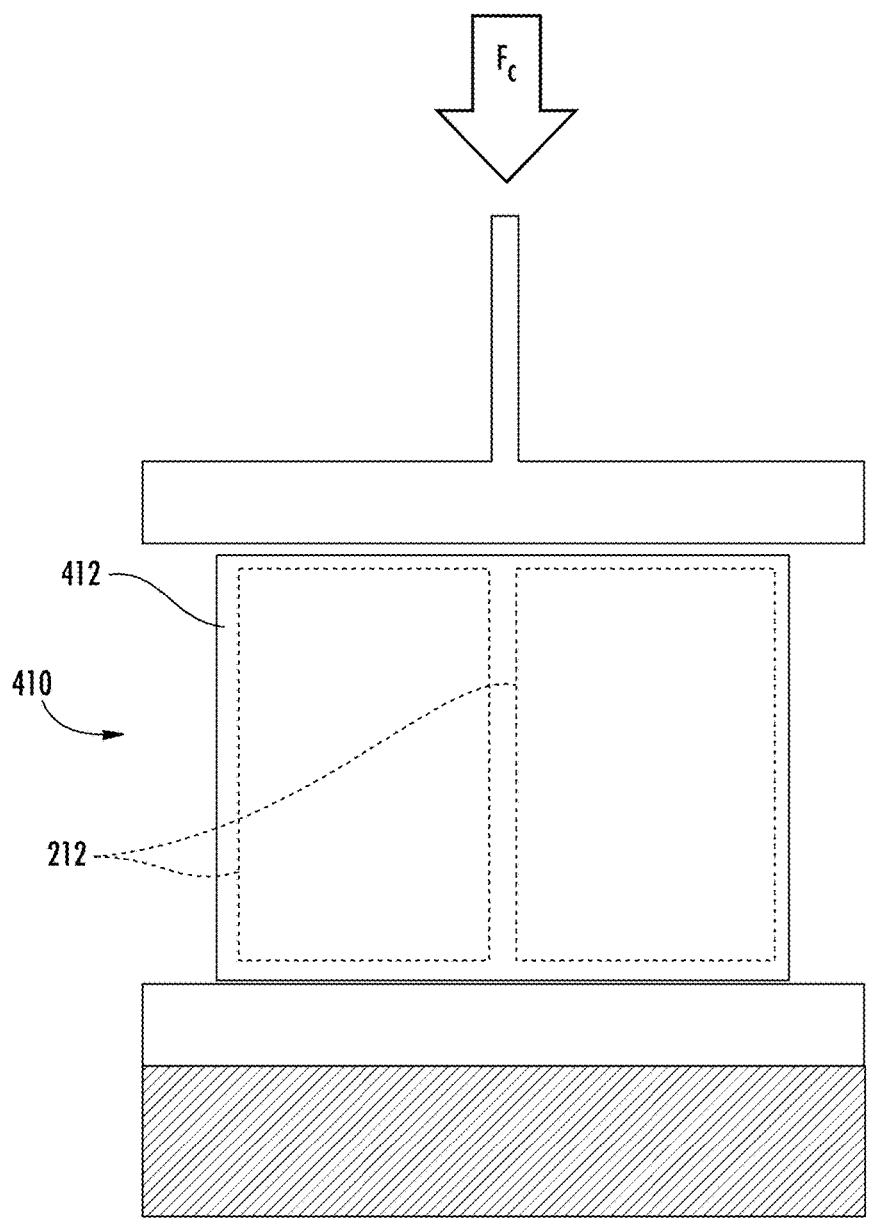
FIG. 7 is a schematic diagram of a package of honeycomb assemblies receiving a crush load.

Referring to FIGS. 6-7, in some embodiments, the honeycomb assemblies are oriented in a vertical direction in the package housing (i.e., all facing the same way), such that the reinforcing tubes 212 of the honeycomb assemblies 210 help buttress the package housing 412 from crush loading $F_c$. In some such embodiments, the package 410 has a crush strength in the vertical direction of greater than 100 kPa, such as greater than 300 kPa, such as greater than even 400 kPa, and/or no more than 10 MPa, where "crush strength" is the compressive stress required to deform the package 410 to half of the original height of the package 410, where "height" and "vertical" correspond to the lengthwise direction of the honeycomb assemblies 210 in the package 410.

Figure 8:
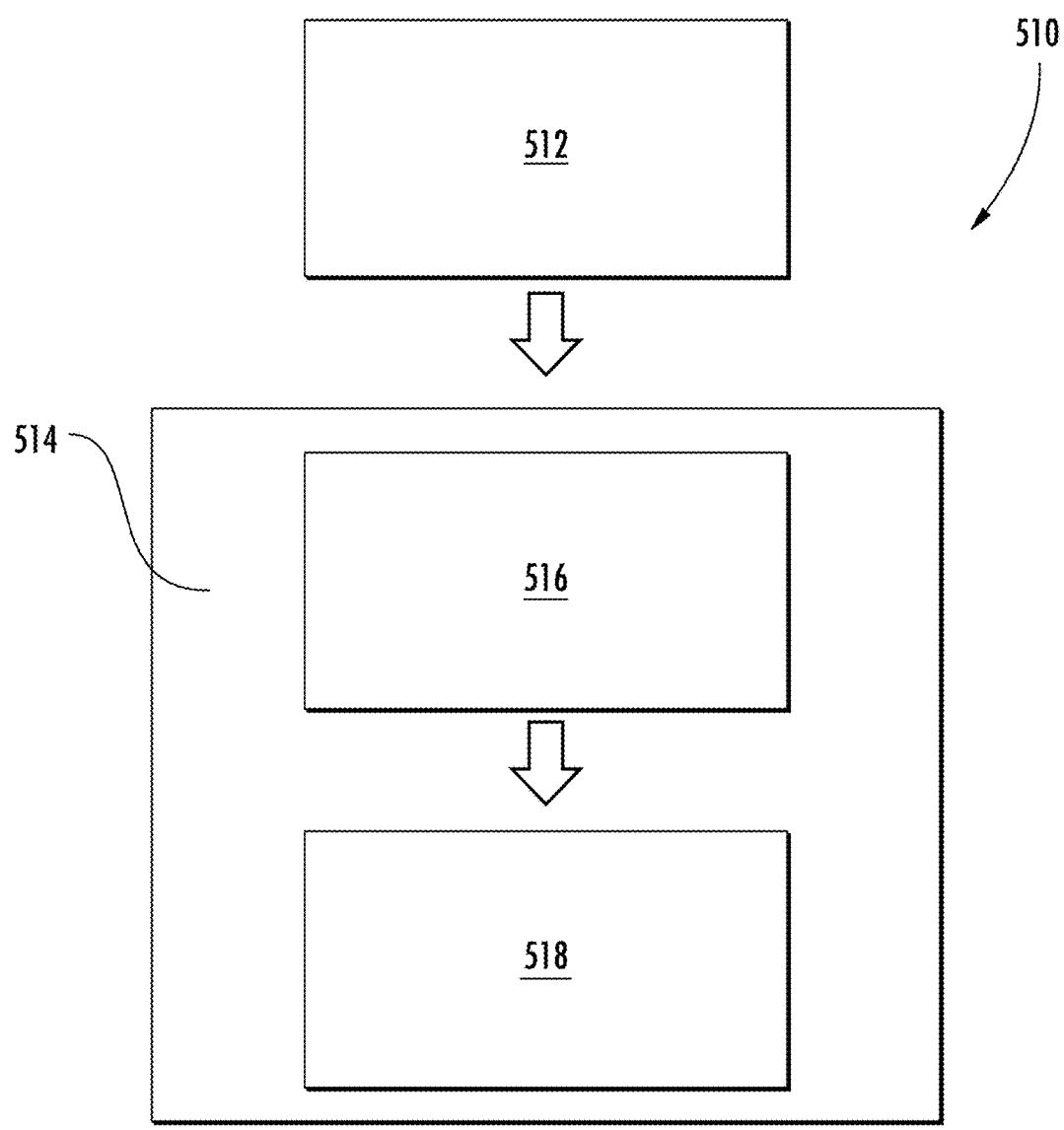
FIG. 8 is a flowchart diagram of a method of structurally testing a honeycomb assembly according to an exemplary embodiment.

Referring to FIG. 8, at least some of the above teachings for assembling the honeycomb assemblies 210 may synergistically also serve to structurally test a honeycomb body 110—in fact, to test each and every honeycomb body 110 so packaged. As such, in some such embodiments, a method 510 of structurally testing a honeycomb body 110 includes a step 512 of positioning a honeycomb body 110110 within a reinforcing tube 212, where, at the time of the positioning, the reinforcing tube 212 is at a temperature above 200° C. The method includes a subsequent step 514 of cooling the reinforcing tube 212 to a temperature of between −50° C. and 100° C., either actively cooling or passively cooling by location in a cooling environment, where, during the cooling, the reinforcing tube 212 contracts and applies and/or increases a radial inward force on the honeycomb body 110, as described herein. Following the cooling step 514, the honeycomb body 110 either demonstrates structural integrity by remaining intact, or cracks or otherwise fails under the radial load of the reinforcing tube 212.

In some embodiments, the positioning step 514 includes sub-steps. One such sub-step 516 includes tightening the reinforcing tube 212 around the honeycomb body 110 while the reinforcing tube 212 is at the temperature above 200° C., as described above. Another such sub-step 518 includes then fastening the reinforcing tube 212 as tightened, while the reinforcing tube 212 is at the high temperature, such as above 200° C. or as otherwise described above.

Figure 9:
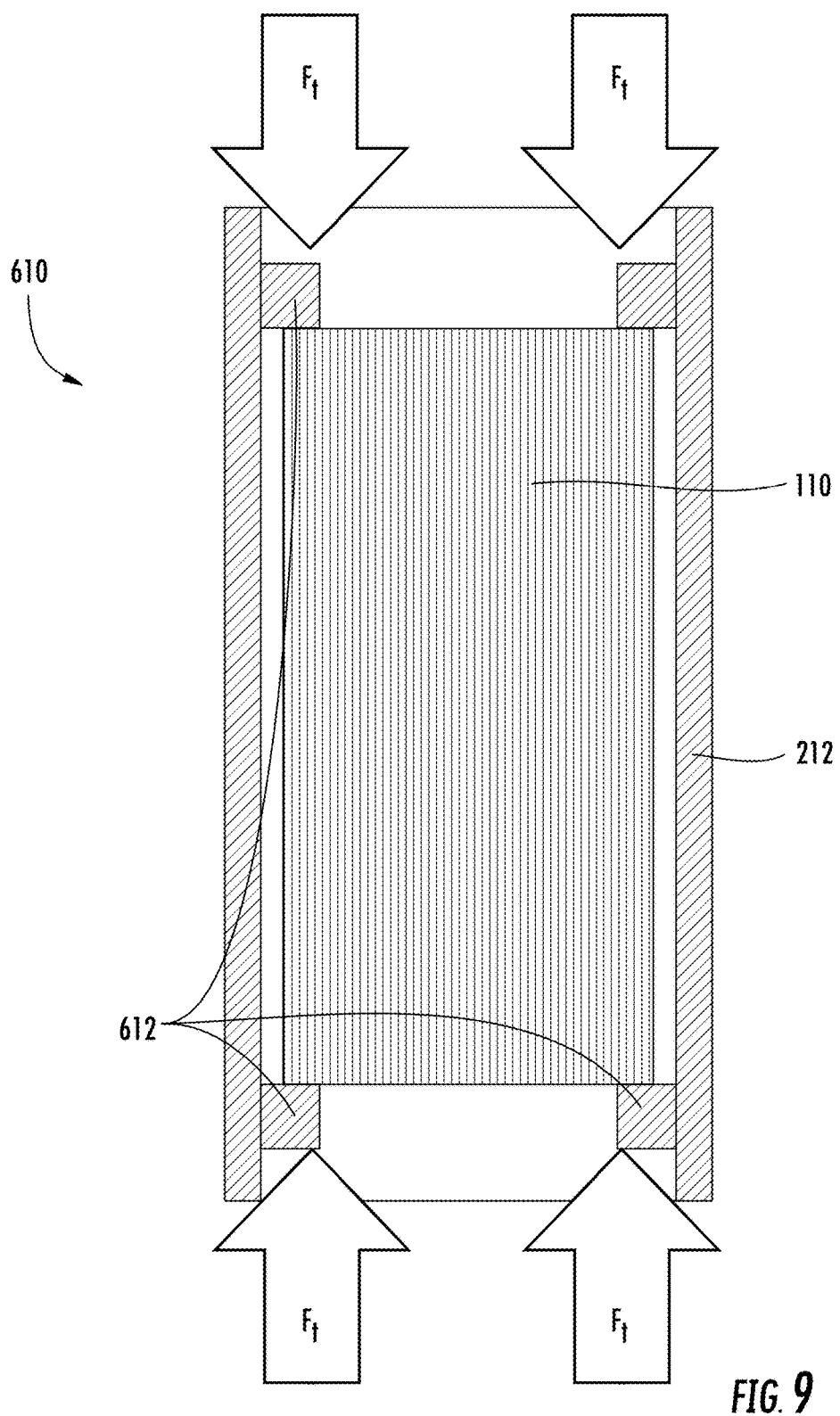
FIG. 9 is a schematic diagram of a honeycomb body of a honeycomb assembly under axial compression, according to an exemplary embodiment.

Referring to FIG. 9, a honeycomb assembly 610 include a honeycomb body 110 positioned within a reinforcing tube 212, as disclosed herein. The reinforcing tube 212 includes inward extensions 612. At room temperature, the inward extensions 612 provide an axial compressive load $F_t$ to hold the honeycomb body 110 within the reinforcing tube 212. According to an exemplary embodiment, some or all of the extensions may be positioned at ends of the honeycomb body 110 when the reinforcing tube is at the high temperature, as disclosed herein. The extensions 612 may be so positioned by forming them when and as needed (e.g., crimping, indenting, welding on). Upon cooling, the reinforcing tube contracts axially, and applies the axial compressive load $F_t$, which in turn results in tension in the portion of the reinforcing tube surrounding the honeycomb body 110. In some embodiments, axial compressive loading $F_t$ is used to hold the substrate with or without radial compressive loading F, and vice versa.

According to some exemplary embodiments, the axial inward force $F_t$ results in at least 1.0 MPa of axial compression on the honeycomb body 110 at the room temperature, such as at least 1.3 MPa of axial compression on the honeycomb body 110 at the room temperature, such as at least 1.5 MPa of axial compression on the honeycomb body 110 at the room temperature, and/or less than 150 MPa. In some such embodiments, the axial inward force $F_t$ results in no more than 800 kPa of axial compression on the honeycomb body 110 at the high temperature (e.g., 500° C.), such as no more than 650 kPa of axial compression on the honeycomb body 110 at the high temperature, such as no more than 400 kPa of axial compression on the honeycomb body 110 at the high temperature, and/or zero compression or a small amount of axial compression greater than zero (e.g., at least 1 Pa).

In some embodiments, the reinforcing tube 212 (e.g., inward extensions 612 therefrom in FIG. 9) provides an axial inward force $F_t$ when the reinforcing tube 212 is at room temperature of 25° C. (e.g., first axial inward force) and a different magnitude of the axial inward force $F_t$ when the reinforcing tube 212 is at a high temperature (e.g., second axial inward force), such as at least 500° C. and less than a melting temperature of the material of the reinforcing tube 212, which is due to greater expansion of the reinforcing tube 212 than the honeycomb body 110. In some such embodiments, the axial inward force $F_t$ at the high temperature is less than 50% than the axial inward force $F_t$ at the room temperature, such as less than 20% than the axial inward force $F_t$ at the room temperature, such as less than 10% than the axial inward force $F_t$ at the room temperature, and/or zero axial inward force $F_t$ or a small amount of axial inward force $F_t$ greater than zero (e.g., at least 0.001% of the first axial inward force $F_t$).

In a subset of all embodiments disclosed herein that include a honeycomb body 110, the honeycomb body may be a ceramic honeycomb body, a ceramic cellular body, or a ceramic cellular substrate. Similarly, in a subset of all embodiments disclosed herein that include a reinforcing tube 212, the reinforcing tube may be a metal skin.

The construction and arrangements of the honeycomb assemblies and package thereof, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. The honeycomb assemblies and package thereof may be used in manners different than those primarily disclosed herein and/or in addition to those disclosed above, such as subsequently integrated in a filter device, such as a catalytic converter for a diesel truck engine, with the reinforcing tube serving as a can surrounding a platinum-coated honeycomb body, or as a support to aid and protect the honeycomb body as the honeycomb body is coated. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A honeycomb assembly, comprising:
    a honeycomb body, wherein the honeycomb body comprises a ceramic material, and wherein the honeycomb body comprises flow paths extending lengthwise at least partway therethrough;
    a reinforcing tube having at least a portion thereof surrounding the honeycomb body, wherein the reinforcing tube comprises a metal material, the reinforcing tube having an interior volume defined as all space interior to interior surfaces of the portion of the reinforcing tube surrounding the honeycomb body,
    wherein, at a room temperature of 25° C., the reinforcing tube provides a first radial inward force upon the honeycomb body that results in an interference fit holding the honeycomb body within the interior volume of the reinforcing tube;
    wherein the metal material of the reinforcing tube has a greater coefficient of thermal expansion than the ceramic material of the honeycomb body;
    wherein the interference fit is such that, when heated to a high temperature, the reinforcing tube provides a second radial inward force upon the honeycomb body that is less than 10% of the first radial inward force, wherein the high temperature is at least 300° C. and less than a melting temperature of the metal material.

2. The honeycomb assembly of claim 1, wherein the first radial inward force results in at least 1.3 MPa of radial compression on the honeycomb body at the room temperature.

3. The honeycomb assembly of claim 1, wherein, at temperatures between 25° C. to 300° C., the metal material has a thermal expansion coefficient of at least $40 \times 10^{-7}$ cm/cm/° C., the ceramic material has a thermal expansion coefficient of no more than $45 \times 10^{-7}$ cm/cm/° C., and the thermal expansion coefficient of the metal material is greater than that of the ceramic material.

4. The honeycomb assembly of claim 1, wherein, at the room temperature, the honeycomb body remains held fixed with respect to the reinforcing tube when the honeycomb body is loaded by a push-out force of up to 500 newtons distributed over one end of the honeycomb body.

5. The honeycomb assembly of claim 1, wherein the second radial inward force is no more than 650 kPa of radial compression on the honeycomb body.

6. The honeycomb assembly of claim 5, wherein the high temperature is 500° C.

7. The honeycomb assembly of claim 1, wherein the reinforcing tube directly contacts at least some exterior-most surfaces of the honeycomb body.

8. The honeycomb assembly of claim 1, wherein at least one of:
    (a) the honeycomb body consists essentially of the ceramic material and
    (b) the reinforcing tube consists essentially of the metal material.

9. The honeycomb assembly of claim 1, wherein the honeycomb body has end faces and a length therebetween, and the reinforcing tube has ends and a length therebetween; wherein the length of the reinforcing tube is greater than the length of the honeycomb body such that at least one of the ends of the reinforcing tube extends lengthwise beyond one of the end faces of the honeycomb body as the honeycomb body is held within the interior volume of the reinforcing tube.

10. The honeycomb assembly of claim 9, wherein the honeycomb body is held within the interior volume of the reinforcing tube such that both ends of the reinforcing tube extend lengthwise beyond respective end faces of the honeycomb body.

11. The honeycomb assembly of claim 10, wherein the ends of the reinforcing tube extend lengthwise beyond the respective end faces of the honeycomb body by at least 5 millimeters at each of the end faces.

12. The honeycomb assembly of claim 1, wherein the honeycomb body is under axial compression at the room temperature and the portion of the reinforcing tube surrounding the honeycomb body is in tension.

13. A honeycomb assembly, comprising:
    a honeycomb body, the honeycomb body having end faces and a length therebetween, wherein the honeycomb body comprises flow paths extending lengthwise at least partway therethrough;
    a reinforcing tube having at least a portion thereof surrounding the honeycomb body, the reinforcing tube having ends and a length therebetween, and the reinforcing tube having an interior volume defined as all space interior to interior surfaces of the portion of the reinforcing tube surrounding the honeycomb body,
    wherein, at temperatures of between −50° Celsius (C) and 100° C., the reinforcing tube provides a radial inward force upon the honeycomb body that results in an interference fit to hold the honeycomb body within the interior volume of the reinforcing tube, wherein the radial inward force is at least 1.3 MPa of radial compression on the honeycomb body at a room temperature of 25°, and
    wherein the length of the reinforcing tube is greater than the length of the honeycomb body such that at least one of the ends of the reinforcing tube extends lengthwise beyond one of the end faces of the honeycomb body as the honeycomb body is held within the interior volume of the reinforcing tube, and wherein the honeycomb body is under axial compression at the room temperature and the portion of the reinforcing tube surrounding the honeycomb body is in tension.

14. The honeycomb assembly of claim 13, wherein the honeycomb body comprises a ceramic material and the reinforcing tube comprises a metal material.

15. The honeycomb assembly of claim 14, wherein the ceramic material has a modulus of rupture of at least 0.9 MPa.

16. The honeycomb assembly of claim 14, wherein, at temperatures between 25° C. to 300° C., the metal material has a thermal expansion coefficient of at least $40 \times 10^{-7}$ cm/cm/° C., the ceramic material has a thermal expansion coefficient of no more than $45 \times 10^{-7}$ cm/cm/° C., and the thermal expansion coefficient of the metal material is greater than that of the ceramic material.

17. The honeycomb assembly of claim 13, wherein the honeycomb body is held within the interior volume of the reinforcing tube such that both ends of the reinforcing tube extend lengthwise beyond respective end faces of the honeycomb body.

18. The honeycomb assembly of claim 17, wherein the ends of the reinforcing tube extend lengthwise beyond the respective end faces of the honeycomb body by at least 5 millimeters at each of the end faces.

19. The honeycomb assembly of claim 13, wherein, at the room temperature, the honeycomb body remains held fixed with respect to the reinforcing tube when the honeycomb body is loaded by a push-out force of up to 500 newtons distributed over one end of the honeycomb body.

20. The honeycomb assembly of claim 13, wherein the reinforcing tube directly contacts at least some exterior-most surfaces of the honeycomb body.

* * * * *

UNITED STATES PATENT AND TRADEMARK OFFICE
CERTIFICATE OF CORRECTION

PATENT NO.       : 10,017,311 B2
APPLICATION NO.  : 15/700687
DATED            : July 10, 2018
INVENTOR(S)      : Dana Craig Bookbinder et al.

Page 1 of 1

It is certified that error appears in the above-identified patent and that said Letters Patent is hereby corrected as shown below:

In the Claims

In Column 12, Line 63, Claim 13, delete "25°," and insert -- 25° C., --, therefor.

Signed and Sealed this
Twelfth Day of May, 2020

Andrei Iancu
*Director of the United States Patent and Trademark Office*